United States Patent
Hattori et al.

(10) Patent No.: US 10,913,564 B2
(45) Date of Patent: Feb. 9, 2021

(54) PACKAGING MACHINE, CONTROL APPARATUS FOR PACKAGING MACHINE, CONTROL METHOD, AND PROGRAM

(71) Applicant: OMRON Corporation, Kyoto (JP)

(72) Inventors: Reiko Hattori, Souraku-gun (JP); Yuki Hirohashi, Nara (JP)

(73) Assignee: OMRON Corporation, Kyoto (JP)

(*) Notice: Subject to any disclaimer, the term of this patent is extended or adjusted under 35 U.S.C. 154(b) by 121 days.

(21) Appl. No.: 15/919,285

(22) Filed: Mar. 13, 2018

(65) Prior Publication Data
US 2018/0297732 A1    Oct. 18, 2018

(30) Foreign Application Priority Data
Apr. 14, 2017    (JP) ................ 2017-080954

(51) Int. Cl.
*B65B 57/12*    (2006.01)
*B65B 5/04*    (2006.01)
(Continued)

(52) U.S. Cl.
CPC ............. *B65B 57/12* (2013.01); *B65B 5/04* (2013.01); *B65B 9/073* (2013.01); *B65B 41/18* (2013.01);
(Continued)

(58) Field of Classification Search
CPC ........ B65B 5/04; B65B 9/073; B65B 51/306; B65B 51/303; B65B 57/12; B65B 57/16;
(Continued)

(56) References Cited

U.S. PATENT DOCUMENTS

| 4,381,637 A | * | 5/1983 | Ballestrazzi | ............. B65B 9/06 53/51 |
| 4,574,566 A | * | 3/1986 | Eaves | .................... B65B 9/067 53/450 |

(Continued)

FOREIGN PATENT DOCUMENTS

| CN | 102211671 A | 10/2011 |
| CN | 103754419 A | 4/2014 |

(Continued)

OTHER PUBLICATIONS

The Office Action dated Jan. 8, 2020 in a related Chinese patent application.
(Continued)

*Primary Examiner* — Thomas M Wittenschlaeger
(74) *Attorney, Agent, or Firm* — Metrolex IP Law Group, PLLC (57) ABSTRACT

A control apparatus for controlling a packaging machine that includes a conveyance mechanism for conveying an item to be packaged includes: an acquirer configured to acquire a detection result from a sensor for detecting an item to be packaged; a determiner configured to obtain elapsed time from a predetermined time point until when the item to be packaged is detected by the sensor, based on the detection result acquired by the acquirer, and determine a shift direction in which the item to be packaged is shifted from a predetermined position, based on the elapsed time; and a controller configured to control, for the item to be packaged for which detection is performed by the sensor, implementation of any one of downstream units that are downstream of a unit in which the detection is performed by the sensor, based on the shift direction that is determined by the determiner.

13 Claims, 6 Drawing Sheets

(51) Int. Cl.
    *B65B 51/30*     (2006.01)
    *B65B 57/16*     (2006.01)
    *G05B 19/418*     (2006.01)
    *B65B 41/18*     (2006.01)
    *B65B 9/073*     (2012.01)
    *B65B 57/04*     (2006.01)
    *B29C 65/00*     (2006.01)

(52) U.S. Cl.
    CPC .......... *B65B 51/303* (2013.01); *B65B 51/306* (2013.01); *B65B 57/04* (2013.01); *B65B 57/16* (2013.01); *G05B 19/41865* (2013.01); *B29C 66/439* (2013.01); *G05B 2219/31432* (2013.01); *G05B 2219/45048* (2013.01); *Y02P 90/02* (2015.11)

(58) Field of Classification Search
    CPC ....... B65B 57/04; B65B 41/18; B29C 66/439; G05B 2219/31432; G05B 2219/45048; G05B 19/41865; Y02P 90/20
    See application file for complete search history.

(56) References Cited

U.S. PATENT DOCUMENTS

| | | | | |
|---|---|---|---|---|
| 4,722,168 | A * | 2/1988 | Heaney | B65B 57/14 53/450 |
| 4,868,759 | A * | 9/1989 | Ross | B65B 41/18 700/125 |
| 4,909,018 | A * | 3/1990 | Yamamoto | B65B 9/067 53/450 |
| 4,964,258 | A * | 10/1990 | Seko | B65B 9/067 53/75 |
| 5,351,464 | A * | 10/1994 | Francioni | B29C 65/18 53/450 |
| 5,524,420 | A * | 6/1996 | Ikuta | B65B 57/12 53/450 |
| 5,689,942 | A * | 11/1997 | Suga | B65B 9/067 53/374.6 |
| 6,119,438 | A * | 9/2000 | Bacon | B65B 9/20 53/451 |
| 10,287,046 | B2 * | 5/2019 | Kiyota | B29C 66/849 |
| 2016/0005298 | A1 * | 1/2016 | Takahashi | G08B 21/187 340/679 |

FOREIGN PATENT DOCUMENTS

| | | |
|---|---|---|
| EP | 0339615 A1 | 9/2018 |
| JP | H5-20651 Y2 | 5/1993 |
| JP | H7-205937 A | 8/1995 |
| JP | 2005-104512 A | 4/2005 |
| JP | 2010-006474 A | 1/2010 |
| JP | 2014-237476 A | 12/2014 |
| JP | 2016-210501 A | 12/2016 |

OTHER PUBLICATIONS

The Japanese Office Action dated Feb. 19, 2019 in a counterpart Japanese patent application.

The extended European search report (EESR) dated Sep. 4, 2018 in a counterpart European patent application.

* cited by examiner

(Tdf<Td)

FIG. 5

(Tdb>Td)

PACKAGING MACHINE, CONTROL APPARATUS FOR PACKAGING MACHINE, CONTROL METHOD, AND PROGRAM

CROSS-REFERENCES TO RELATED APPLICATIONS

This application claims priority to Japanese Patent Application No. 2017-080954 filed Apr. 14, 2017, the entire contents of which are incorporated herein by reference.

FIELD

The disclosure relates to a packaging machine such as a pillow packaging machine, and also a control apparatus, a control method, and a program for controlling this packaging machine.

BACKGROUND

Conventionally, packaging machines such as a pillow packaging machine are widely used to individually and rapidly package products that are mass-produced on production lines. A horizontal pillow packaging machine is an example of a pillow packaging machine.

Figure 8:
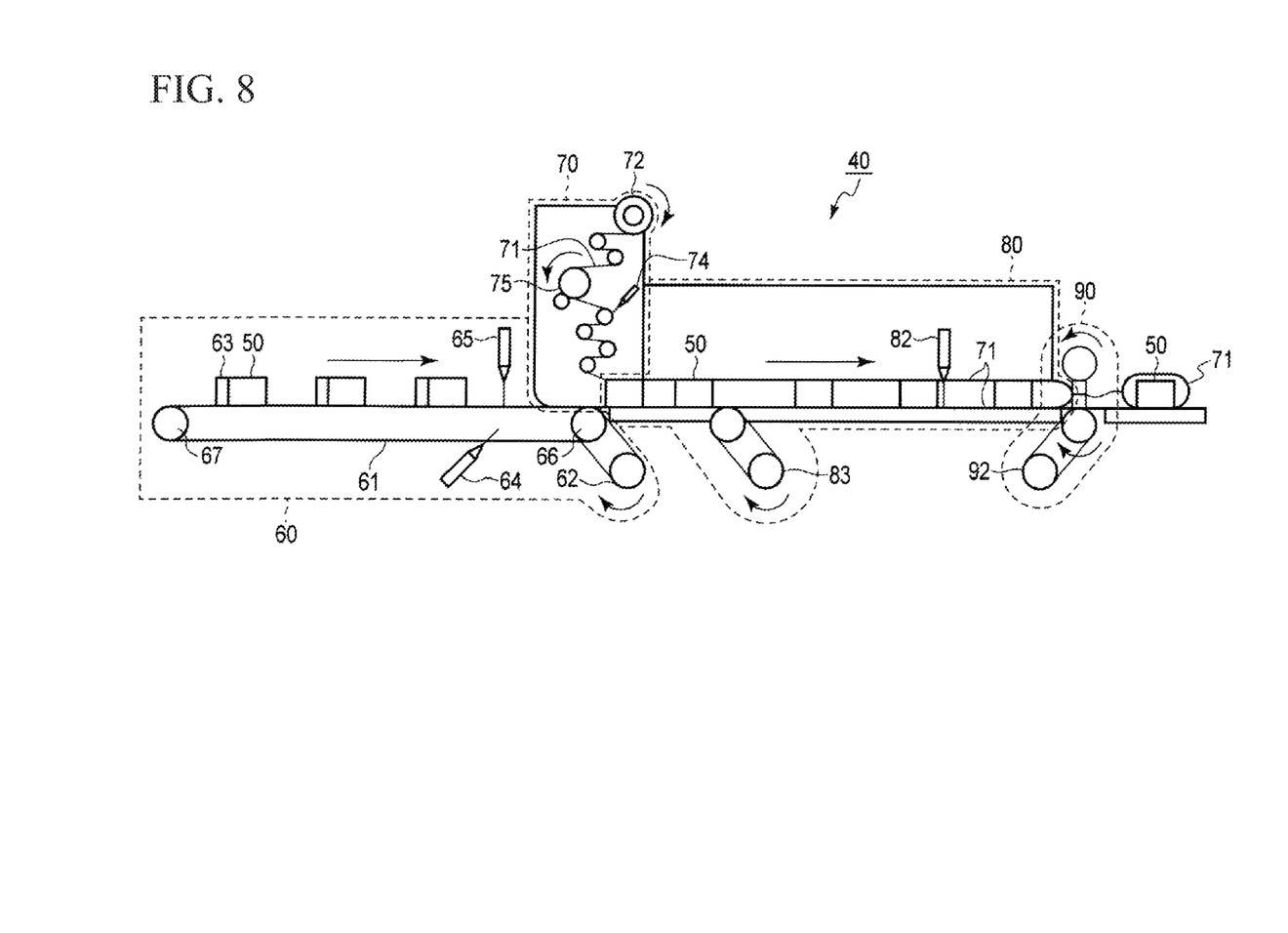
FIG. 8 is a schematic view illustrating a configuration example of a typical horizontal pillow packaging machine.

FIG. 8 is a schematic view showing a configuration example of a typical horizontal pillow packaging machine.

A horizontal pillow packaging machine 40 shown as an example in FIG. 8 is constituted by a workpiece conveyance mechanism 60, a film conveyance mechanism (main) 70, a film conveyance mechanism (sub) 80, and a top sealing mechanism 90.

The workpiece conveyance mechanism 60 is provided with sprockets 66 and 67 that are arranged in the front and rear, an endless chain 61 that is wound around the sprockets 66 and 67, and a servomotor 62 that provides a driving force for rotating the front sprocket 66.

Furthermore, a plurality of transferring fingers 63, which are positioning protrusions for placing workpieces 50 at even intervals on the endless chain 61, are provided on a surface of the endless chain 61 at even intervals in a longitudinal direction thereof.

The front sprocket 66 rotates as a result of being driven by the servomotor 62, and the transferring fingers 63 move from the upstream side (left side in the diagram) toward the downstream side (right side in the diagram) as a result of the endless chain 61 rotating.

Upon the transferring fingers 63 thus abutting against rear faces of the workpieces 50 that have been conveyed from an upstream apparatus (not shown) to the workpiece conveyance mechanism 60, the workpieces 50 also move forward due to the movement of the transferring fingers 63.

Note that, in this specification, items to be packaged by the horizontal pillow packaging machine 40 are referred to as workpieces 50.

The workpiece conveyance mechanism 60 is also provided with an optical sensor 64 for detecting the workpieces 50 conveyed by the endless chain 61.

The workpiece conveyance mechanism 60 is further provided with a workpiece ride-over sensor 65. A workpiece 50 that has ridden over foreign matter (not shown) is detected by the workpiece ride-over sensor 65.

In the film conveyance mechanism (main) 70, a roll 72, around which a film 71 is wound, is rotated by a servomotor 75, and thus, the film 71 is supplied toward the film conveyance mechanism (sub) 80 side.

Register marks, which are used as marks for sealing (hereinafter referred to simply as "top sealing") the film 71 in a direction perpendicular to the travelling direction of the film 71 and cutting of the film 71 in the top sealing mechanism 90, are provided at even intervals on the surface of the film 71. As a result of the register marks being detected every predetermined period by an optical sensor 74 for detecting the register marks, it is confirmed that the film 71 has been supplied to the film conveyance mechanism (sub) 80 at a predetermined speed.

In the film conveyance mechanism (sub) 80, the film 71 that has been supplied from the film conveyance mechanism (main) 70 is formed into a tubular shape on the upstream side (left side) in the film conveyance mechanism (sub) 80. Next, a workpiece 50 is fed into this tube of the film 71 by the workpiece conveyance mechanism 60, and is arranged in a region partitioned by the register marks.

The workpiece 50 that has been conveyed to the film conveyance mechanism (sub) 80 in a state of being arranged in the tube of the film 71 is conveyed together with the film 71 toward the top sealing mechanism 90 side. The film 71 and workpiece 50 are conveyed by a servomotor 83. An arrangement state of the workpiece 50 in the region partitioned by the register marks in the tube of the film 71 is detected by an optical sensor 82, which is a sensor for detecting a shift of a workpiece.

The film 71 made into a tube in which the workpiece 50 is arranged is simultaneously subjected to top sealing and cutting by the top sealing mechanism 90, which is driven by a servomotor 92. Thus, the workpiece 50 in a state of being individually packaged in the film 71 is discharged from the horizontal pillow packaging machine 40.

JP 2005-104512A and JP 2010-006474A are examples of background art.

However, this horizontal pillow packaging machine 40 has the following problem.

Figure 9:
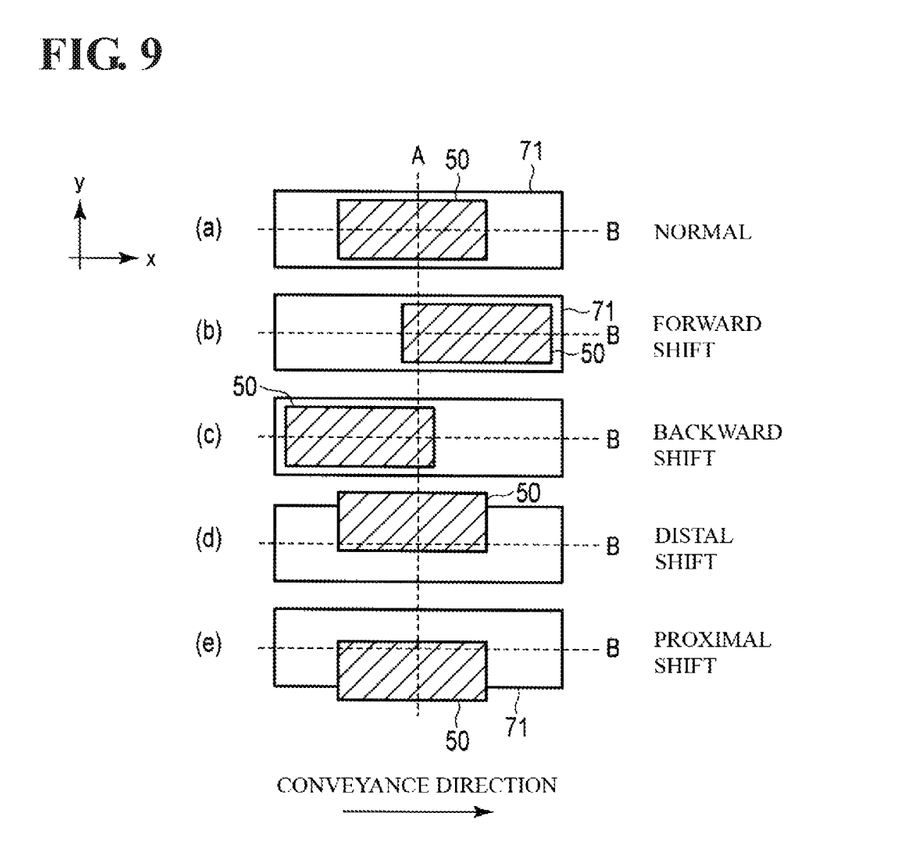
FIG. 9 is a diagram illustrating top views illustrating an example of typical patterns of a positional relationship between a workpiece and a film.

FIG. 9 shows top views illustrating an example of typical patterns of the positional relationship between a workpiece 50 and the film 71 when detected by the optical sensor 82. The x axis in FIG. 9 corresponds to the direction in which the workpiece 50 is conveyed and the longitudinal direction of the film 71, and the y axis corresponds to the width direction of the film 71.

Figure 10:
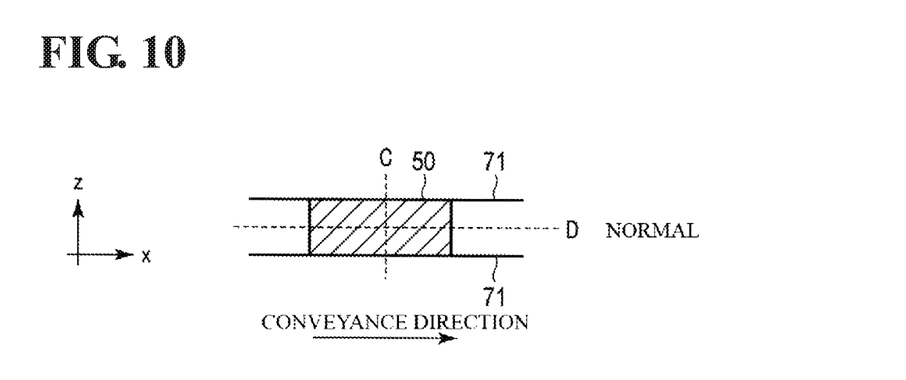
FIG. 10 is a side view illustrating an example of a typical pattern of a positional relationship between a workpiece and a film.

FIG. 10 is a side view illustrating an example of a typical pattern of the positional relationship between a workpiece 50 and the film 71 when detected by the optical sensor 82. The x axis in FIG. 10 corresponds to the direction in which the workpiece 50 is conveyed and the longitudinal direction of the film 71, and the z axis corresponds to the height direction of the workpiece 50.

In both FIGS. 9 and 10, the rightward direction in the diagrams corresponds to the top sealing mechanism 90 side (i.e. downstream unit side).

If the horizontal pillow packaging machine 40 is properly operating continuously, the positional relationship between the workpiece 50 and the film 71 when detected by the optical sensor 82 is in a state where the workpiece 50 is arranged substantially at the center of the region partitioned by the register marks in the film 71, as shown in (a) of FIG. 9 and FIG. 10.

In FIG. 9, the broken line B is a line that passes through the center of the film 71 in the width direction. Accordingly, the broken line B is parallel to the longitudinal direction of the film 71. The broken line A corresponds to the position at which the optical sensor 82 is arranged in the longitudinal direction of the film 71. The intersection point between the broken line A and the broken line B corresponds to a target position for a light beam emitted by the optical sensor 82.

In FIG. 10, the broken line C corresponds to the vertically downward direction from the position at which the optical sensor 82 is arranged, and the broken line D is a horizontal line that passes through at a position that is at half the height of the workpiece 50.

A state where the direction in which the workpiece 50 is conveyed coincides with the longitudinal direction of the film 71, and where the intersection point between the broken line A and the broken line B coincides with the planar center point of the workpiece 50 when seen from above, as shown in (a) of FIG. 9 and FIG. 10, will be hereinafter referred to as a "normal state".

Meanwhile, (b) of FIG. 9 shows a state where the direction in which the workpiece 50 is conveyed coincides with the longitudinal direction of the film 71, but the workpiece 50 is shifted toward the downstream unit side. This state will be hereinafter referred to as a "forward shift".

(c) of FIG. 9 shows a state where the direction in which the workpiece 50 is conveyed coincides with the longitudinal direction of the film 71, but the workpiece 50 is shifted toward the upstream unit side, conversely to (b) of FIG. 9. This state will be hereinafter referred to as a "backward shift".

In addition, there are also a "distal shift", i.e. a state where the workpiece 50 is not shifted forward or backward, but the line that passes through the center of the workpiece 50 in the width direction is shifted toward the distal side, which is the upper side in the diagram relative to the broken line B, as shown in (d) of FIG. 9, and a "proximal shift", i.e. a state where the workpiece 50 is not shifted forward or backward, but the line that passes through the center of the workpiece 50 in the width direction is shifted toward the proximal side, which is the lower side in the diagram relative to the broken line B, as shown in (e) of FIG. 9, conversely to (d) of FIG. 9. Furthermore, there are also many more patterns that are any combination of the shifts shown in (b) to (e) of FIG. 9.

Of many of the aforementioned shift patterns, the forward shift shown in (b) of FIG. 9 and the backward shift shown in (c) of FIG. 9 are serious position shifts that may cause jamming of the workpiece 50 in the top sealing mechanism 90. The reason will be described below.

In the normal state shown in (a) of FIG. 9, the top sealing mechanism 90 performs processing such as top sealing and cutting on the film 71 between a workpiece 50 and the following workpiece 50. Thus, the film 71 is subjected to top sealing and cutting, and as a result, an individually packaged workpiece 50 is discharged from the top sealing mechanism 90.

The distal shift shown in (d) of FIG. 9 and the proximal shift shown in (e) of FIG. 9 are naturally corrected to the normal state shown in (a) of FIG. 9 as a result of the workpiece 50 being constantly pulled toward the center side of the film 71 in the width direction by the film 71 while being conveyed. For this reason, the distal shift and proximal shift do not cause jamming of the workpiece 50 in the top sealing mechanism 90.

However, if the top sealing mechanism 90 operates for a workpiece 50 that is shifted forward as shown in (b) of FIG. 9 or backward as shown in (c) of FIG. 9, there is a concern that the workpiece 50 will become jammed and be damaged. Moreover, it may also wear or degrade a cutter in the top sealing mechanism 90.

In the conventional techniques, such a jam is recognized by detecting the occurrence of an actual jam. Upon the occurrence of a jam being recognized, the jam is addressed by stopping the horizontal pillow packaging machine 40 and removing the jammed workpiece. However, this way of addressing a jam involves stopping of the horizontal pillow packaging machine 40, and therefore lowers the operation efficiency, which is not favorable.

One or more aspects have been made in view of the foregoing situation, and aims to provide a control apparatus for a packaging machine, a control method, and a program that enable the occurrence of a jam to be avoided without stopping operations of the packaging machine even if a position shift of a workpiece in the conveyance direction that may cause a jam has occurred, and thus maintain high production efficiency, as well as a packaging machine that is controlled by that control apparatus.

SUMMARY

To achieve the above-stated object, one or more aspects take the following measures.

That is to say, a first aspect is a control apparatus for controlling a packaging machine that includes a conveyance mechanism for conveying an item to be packaged, the apparatus including: an acquirer configured to acquire, from a sensor for detecting a position of the item to be packaged, position detection information indicating a position to which the item to be packaged is conveyed in the conveyance mechanism; a determiner configured to determine a shift direction in which the item to be packaged is shifted from a predetermined position relative to a conveyance direction, based on the position detection information acquired by the acquirer; and a controller configured to control, for the item to be packaged for which position detection is performed by the sensor, implementation of a downstream unit that is downstream of a unit in which the position detection is performed by the sensor, based on the shift direction that is determined by the determiner.

A second aspect is a control apparatus for controlling a packaging machine that includes a conveyance mechanism for conveying an item to be packaged, the apparatus including: an acquirer configured to acquire, from a sensor for detecting the item to be packaged, conveyance timing detection information indicating a conveyance timing at which the item to be packaged is conveyed in the conveyance mechanism; a determiner configured to obtain elapsed time from a preset reference time point until when the item to be packaged is detected by the sensor, based on the conveyance timing detection information acquired by the acquirer, and determine a shift direction in which the item to be packaged is shifted from a predetermined position, based on the elapsed time; and a controller configured to control, for the item to be packaged for which detection is performed by the sensor, implementation of a downstream unit that is downstream of a unit in which the detection is performed by the sensor, based on the shift direction that is determined by the determiner.

Furthermore, a third aspect is the control apparatus in a second aspect in which the determiner determines that the shift direction is a direction toward a downstream unit side if the elapsed time is shorter than a predetermined first threshold, and determines that the shift direction is a direction toward an upstream unit side if the elapsed time is longer than a predetermined second threshold, and if it is determined by the determiner that the shift direction is a direction toward the downstream unit side, the controller controls the packaging machine so that the downstream unit is not implemented for the item to be packaged for which the detection is performed by the sensor, during a processing period in a case where a shift does not occur, and if it is determined by the determiner that the shift direction is a direction toward the upstream unit side, the controller controls the packaging machine so that the downstream unit is not implemented for the item to be packaged for which the detection is performed by the sensor, during a processing period that comes later than a processing period in a case where the shift does not occur.

Also, in a fourth aspect, the processing period is defined by a cycle representing a unit of processing time for processing to be performed by each of a plurality of units, and the processing period that comes later than the processing period in the case where the shift does not occur starts one cycle after the processing period in the case where the shift does not occur.

A fifth aspect is the control apparatus in a third aspect in which, in a case where the packaging machine is a pillow packing machine that includes a unit for covering at least a plurality of the items to be packaged with a packaging material, and a unit for separating the plurality of covered items to be packaged by a preset unit number, the controller controls the pillow packaging machine so that the separating unit is not implemented for an item to be packaged regarding which the shift direction is determined, while giving consideration to time required from implementation of the unit in which the detection is performed by the sensor until implementation of the separating unit.

A sixth aspect is a packaging machine that includes the control apparatus in any one of first to fifth aspects.

A seventh aspect is a method for controlling a packaging machine that includes a conveyance mechanism for conveying an item to be packaged, the method including: acquiring, from a sensor for detecting a position of the item to be packaged, position detection information indicating a position to which the item to be packaged is conveyed in the conveyance mechanism; determining a shift direction in which the item to be packaged is shifted from a predetermined position relative to a conveyance direction, based on the acquired position detection information; and controlling, for the item to be packaged for which position detection is performed by the sensor, implementation of a downstream unit that is downstream of a unit in which the position detection is performed by the sensor, based on the shift direction that is determined by the determiner.

An eighth aspect is a method for controlling a packaging machine that includes a conveyance mechanism for conveying an item to be packed, the method including: acquiring, from a sensor for detecting the item to be packaged, conveyance timing detection information indicating a conveyance timing at which the item to be packaged is conveyed in the conveyance mechanism, obtaining elapsed time from a preset reference time point until when the item to be packaged is detected by the sensor, based on the acquired conveyance timing detection information, and determining a shift direction in which the item to be packaged is shifted from a predetermined position, based on the elapsed time, and controlling, for the item to be packed for which detection is performed by the sensor, implementation of a downstream unit that is downstream of a unit in which the detection is performed by the sensor, based on the shift direction that is determined by the determiner.

A ninth aspect is a program for causing a computer to function as each portion in the control apparatus described in any one of first to fifth aspects.

According to the first, sixth, seventh, and ninth aspects, the shift direction, i.e. the direction of a shift of the item to be packaged that may cause a jam, is determined based on the result of detecting the position of the item to be packaged, and preventive control for avoiding jamming of the item to be packaged is performed on any of the downstream units in accordance with the shift direction. Thus, a jam can be avoided while continuing the operations of the packaging machine.

According to the second, sixth, eighth, and ninth aspects, the shift direction, i.e. the direction of a shift of the item to be packaged that may cause a jam is determined based on the elapsed time from a predetermined time point until when the item to be packaged is detected by the sensor, and preventive control is performed on any of the downstream units in accordance with the shift direction. Thus, jamming of the item to be packaged can be avoided while continuing the operations of the packaging machine.

According to a third aspect, the shift direction can be determined by comparing the elapsed time with two different thresholds. Furthermore, when the unit for separating the unit number of items to be packaged from a plurality of items to be packaged that are covered with a packaging material is implemented in the packaging machine, preventive control for avoiding a jam can be performed in accordance with the shift direction in which the item to be packaged is shifted.

According to a fourth aspect, preventive control for avoiding a jam can be performed in unit of cycle.

According to a fifth aspect, control can be performed for the item to be packaged regarding which the shift direction has been determined, so that the separating unit is not implemented therefor, while giving consideration to the time required from implementation of the unit in which the detection is performed by the sensor until implementation of the separating unit.

DETAILED DESCRIPTION

Hereinafter, the best modes for carrying out one or more embodiments will be described with reference to the drawings.

Note that, as for the signs in the diagrams used in the description of the following embodiments, the same portions as those in FIGS. 8 to 10 are assigned the same signs to avoid redundant descriptions.

First Embodiment

Figure 1:
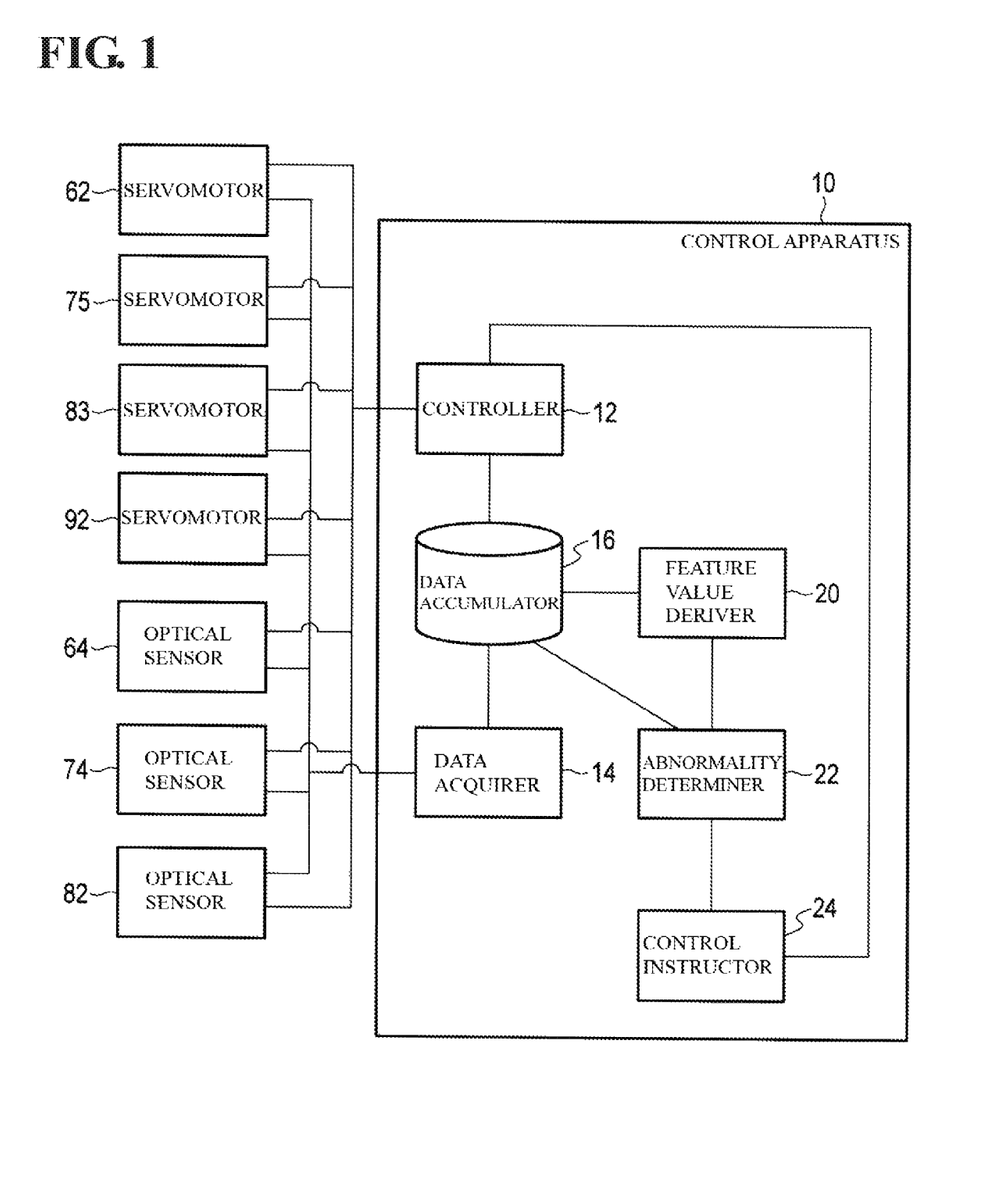
FIG. 1 is a functional block diagram illustrating a configuration example of a control apparatus to which a control method according to a first embodiment is applied.

FIG. 1 is a functional block diagram showing a configuration example of a control apparatus 10 to which a control method according to a first embodiment is applied.

The control apparatus 10 according to a first embodiment is an apparatus for controlling a packaging machine, has a CPU (Central Processing Unit) and a program memory that constitute a computer, and includes, as portions for performing control required for carrying out a first embodiment, a controller 12, a data acquirer 14, a feature value deriver 20, an abnormality determiner 22, and a control instructor 24. All of these portions are realized by causing the CPU to execute programs stored in the program memory.

The control apparatus 10 also includes a data accumulator 16. The data accumulator 16 is a nonvolatile memory or a storage medium into/from which data can be written and read at any time, such as an SSD (Solid State Drive) or a HDD (Hard Disk Drive).

The following description will take, as an example, a case where this control apparatus 10 is applied to a horizontal pillow packaging machine 40 shown in FIG. 8. However, the control apparatus 10 is not limited to one that is applied to the horizontal pillow packaging machine 40, and is also applicable to any other type of packaging machine, such as a vertical pillow packaging machine.

The controller 12 regularly outputs a servo latch signal to servomotors 62, 75, 83, and 92 and the data accumulator 16 in every period T. The servomotors 62, 75, 83, and 92 are driven in accordance with intervals of the servo latch signal. The data accumulator 16 stores information regarding the time at which the servo latch signal is output.

As a result of the servomotors 62, 75, 83, and 92 being thus driven in accordance with the servo latch signal, the horizontal pillow packaging machine 40 is driven, and workpieces 50 and a film 71 are conveyed toward the downstream unit side.

In response thereto, in a film conveyance mechanism (main) 70, an optical sensor 74 detects register marks that are provided at even intervals on a surface of the film 71, and outputs detection result data to the data acquirer 14. In a workpiece conveyance mechanism 60, an optical sensor 64 detects the workpieces 50 that are being conveyed, and outputs detection result data to the data acquirer 14. In a film conveyance mechanism (sub) 80, an optical sensor 82 detects the workpieces 50 that are being continuously conveyed, and outputs detection result data to the data acquirer 14. Furthermore, the torque of the servomotor 92 in the top sealing mechanism 90 is also output to the data acquirer 14.

The data acquirer 14 thus acquires the detection result data, which are physical quantities that indicate states, from the optical sensors 64, 74, and 82, and the servomotors 75 and 92, for each cycle. "Cycle" refers to a unit of processing time for processing performed by each of a plurality of units. The data acquirer 14 outputs the aforementioned detection result data to the data accumulator 16 and causes the data accumulator 16 to store it.

The data accumulator 16 stores the detection result data output from the data acquirer 14.

Figure 2:
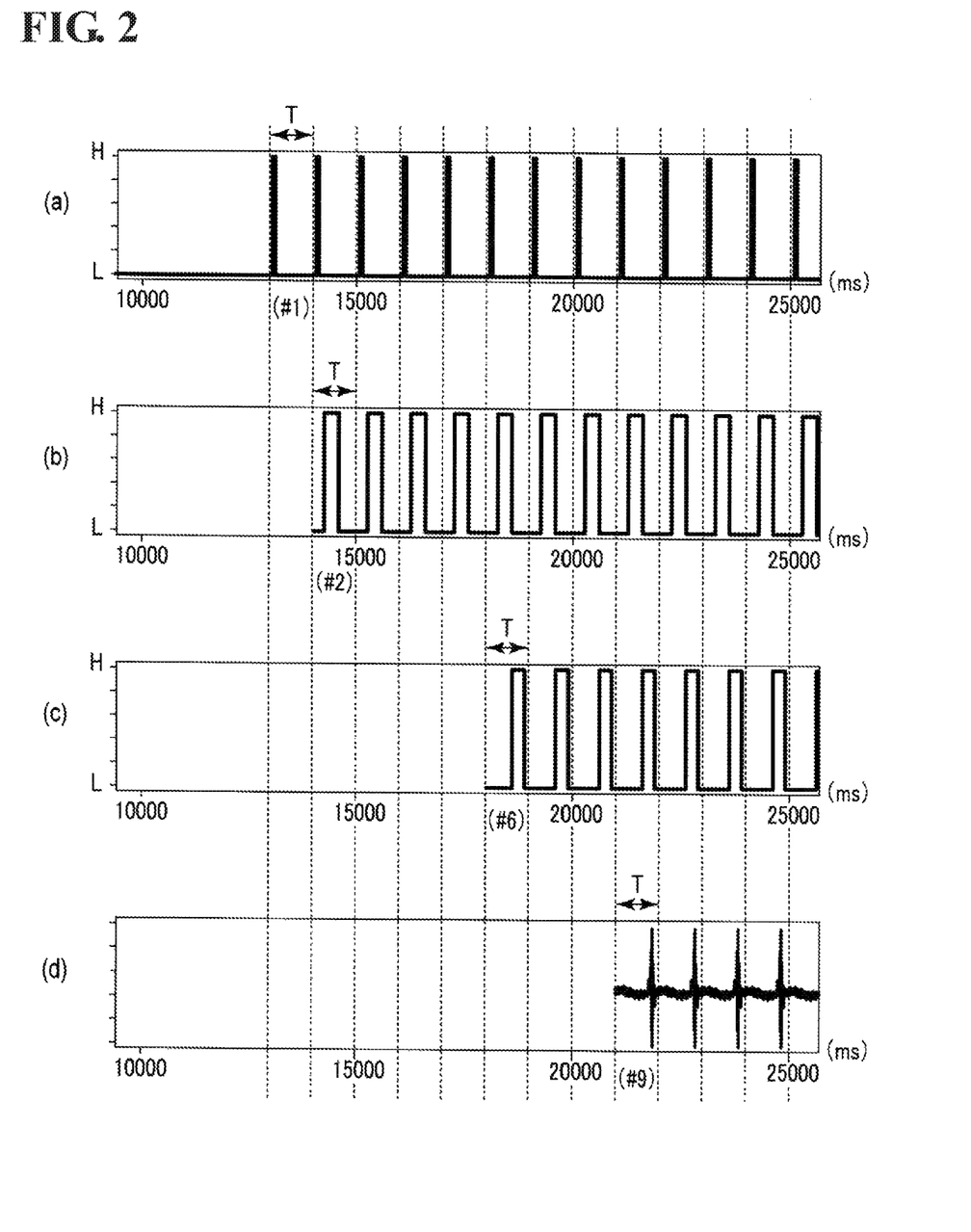
FIG. 2 is a diagram illustrating an example of a temporal relationship between detection signals acquired after a horizontal pillow packaging machine is started.

FIG. 2 shows an example of a temporal relationship between detection results acquired after the horizontal pillow packaging machine 40 is started. FIG. 2 shows diagrams in which some parts of the detection result data stored in the data accumulator 16 are indicated with the same time axis that is based on a cycle unit of the period T, for example, and the unit of the horizontal axis is ms (millisecond).

That is to say, upon control of the horizontal pillow packaging machine 40 being started in a cycle #1, the servo latch signal is output from the controller 12 to the servomotor 75. The servomotor 75 is driven in accordance therewith, and, as a result of the film 71 being fed from the film conveyance mechanism (main) 70 to the film conveyance mechanism (sub) 80, the register marks are detected by the optical sensor 74.

Pulses shown in (a) of FIG. 2 correspond to the detection signal output from the optical sensor 74.

Thereafter, the servo latch signal is regularly output in every period T from the controller 12 for the downstream units, and accordingly, the detection signal is also regularly output in every period T from the optical sensor 74.

In the workpiece conveyance mechanism 60, a workpiece 50, which is to be arranged between a register mark that is detected by the optical sensor 74 in a cycle #1 of the film conveyance mechanism (main) 70 and a register mark that is detected by the optical sensor 74 in a cycle #2 of the film conveyance mechanism (main) 70, is detected in the cycle #2 by the optical sensor 64.

Pulses shown in (b) of FIG. 2 correspond to the detection signal output from the optical sensor 64. If the horizontal pillow packaging machine 40 is normally operating continuously, thereafter, this detection signal is also output regularly in every period T.

A workpiece 50 that is detected in a cycle #2 of the workpiece conveyance mechanism 60 is detected by the optical sensor 82 in a cycle #6 of the film conveyance mechanism (sub) 80, in a state of being arranged in a tube of the film 71 between the register mark detected in the cycle #1 of the film conveyance mechanism (main) 70 and the register mark detected in the cycle #2 of the film conveyance mechanism (main) 70.

Pulses shown in (c) of FIG. 2 correspond to the detection signal output from the optical sensor 82. If the horizontal pillow packaging machine 40 is normally operating continuously, thereafter, this detection signal is also output regularly in every period T.

The workpiece 50 detected in the cycle #6 in the film conveyance mechanism (sub) 80 is conveyed to the top sealing mechanism 90, and is subjected to top sealing and cutting in a cycle #9.

A waveform shown in (d) of FIG. 2 corresponds to a waveform signal of the torque of the servomotor 92 in the top sealing mechanism 90. A steep peak of the waveform indicates a state where torque is applied to the servomotor 92. If the horizontal pillow packaging machine 40 is normally operating continuously, thereafter, this steep peak also regularly occurs in every period T.

As mentioned above, if the horizontal pillow packaging machine 40 is normally operating continuously, all of these detection signals are thereafter regularly generated in every period T. Meanwhile, the timing at which a detection signal is generated for the same workpiece 50 is delayed the further a mechanism is located on the downstream unit side.

The feature value deriver 20 performs analysis based on the aforementioned detection result data stored in the data accumulator 16, derives a feature value, which is a value of a predetermined feature, and outputs the derived feature value to the abnormality determiner 22. The feature value may be, but not limited to, elapsed time from a rise of the servo latch signal until a rise of the detection signal from the optical sensor 82, for example.

Figure 3:
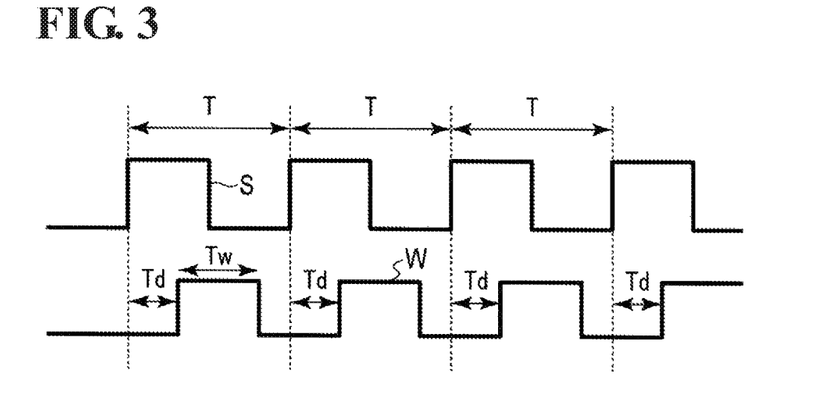
FIG. 3 is a schematic diagram illustrating a temporal relationship between a servo latch signal that is detected when a workpiece is in a normal state and a detection signal from a workpiece shift sensor.

FIG. 3 is a schematic diagram showing a temporal relationship between a servo latch signal S detected for a workpiece 50 in a normal state, as shown in (a) of FIG. 9 and FIG. 10, and a detection signal W from the optical sensor 82. FIG. 3 is also understood as a schematic diagram showing a temporal relationship between (a) and (c) of FIG. 2.

If workpieces 50 are in a normal state, elapsed time Td, which is the time from a rise of the servo latch signal S until a rise of the detection signal W from the optical sensor 82, is fixed in all cycles.

Figure 4:
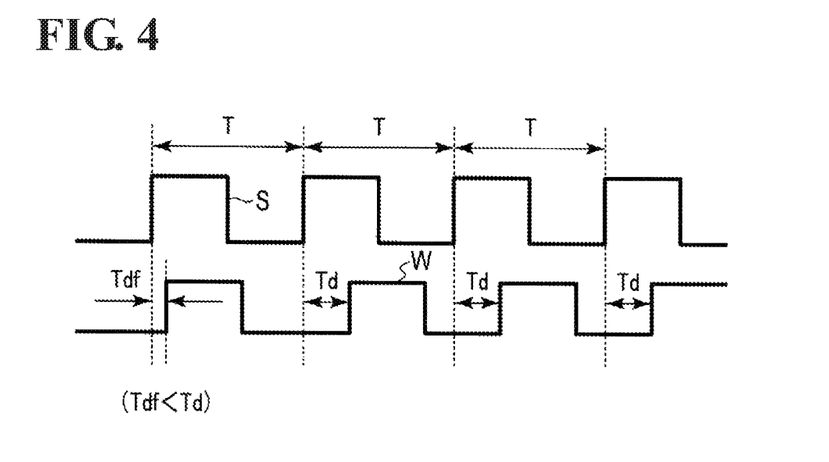
FIG. 4 is a schematic diagram illustrating a temporal relationship between a servo latch signal that is detected when a workpiece is shifted forward and a detection signal from a workpiece shift sensor.

A first cycle shown in FIG. 4 indicates a temporal relationship between a servo latch signal S detected for a workpiece 50 that is shifted forward, as shown in (b) of FIG. 9, and the detection signal W from the optical sensor 82. The workpieces 50 that is shifted forward is detected earlier than the workpieces 50 in the normal state, and accordingly, elapsed time Tdf in this case is shorter than the elapsed time Td detected in the normal state. Note that the second and subsequent cycles indicate that workpieces 50 are in a normal state and the elapsed time is Td.

Figure 5:
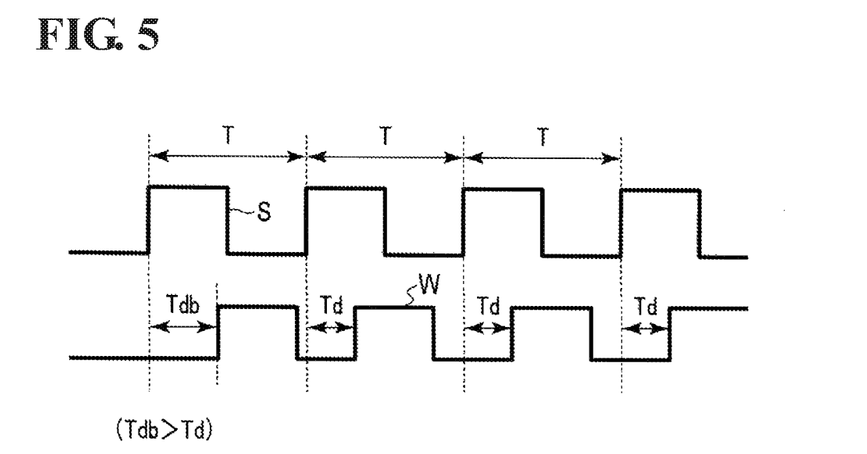
FIG. 5 is a schematic diagram illustrating a temporal relationship between a servo latch signal that is detected when a workpiece is shifted backward and a detection signal from a workpiece shift sensor.

A first cycle shown in FIG. 5 indicates a temporal relationship between a servo latch signal S detected for a workpiece 50 that is shifted backward, as shown in (c) of FIG. 9, and the detection signal W from the optical sensor 82. The workpiece 50 that is shifted backward is detected later than a workpiece 50 in the normal state, and accordingly, elapsed time Tdb in this case is longer than the elapsed time Td detected in the normal state. Note that the second and subsequent cycles indicate that workpieces 50 are in a normal state and the elapsed time is Td.

The feature value deriver 20 outputs the aforementioned elapsed time as a feature value to the abnormality determiner 22.

The abnormality determiner 22 first determines, regarding the elapsed time output from the feature value deriver 20, whether or not the workpiece 50 is shifted forward, and then determines whether or not the workpiece 50 is shifted backward.

For this purpose, the abnormality determiner 22 compares the elapsed time output from the feature value deriver 20 with a threshold th1_forward, which is predetermined for a forward shift and is stored in the abnormality determiner 22. If the elapsed time is shorter than the threshold th1_forward, it is determined that the workpiece 50 is shifted forward.

If it is not determined that the workpiece 50 is shifted forward, the abnormality determiner 22 compares the elapsed time with a threshold th1_back, which is predetermined for a backward shift and is stored in the abnormality determiner 22. If the elapsed time is longer than the threshold th1_back, it is determined that the workpiece 50 is shifted backward.

If it is determined that the workpiece 50 is shifted forward or backward, the abnormality determiner 22 determines that a product position shift has occurred in the film conveyance mechanism (sub) 80, and outputs the determination results, which include a detection location (film conveyance mechanism (sub) 80), abnormality details (product position shift), and an abnormal cycle (e.g. cycle #6), to the control instructor 24.

Note that the above description has taken an example in which the feature value deriver 20 performs analysis based on the physical quantities of the data stored in the data accumulator 16 and derives a feature value, and the abnormality determiner 22 determines whether or not an abnormality has occurred, based on the feature value. However, the abnormality determiner 22 may also directly use the physical quantities of the data stored in the data accumulator 16 to determine whether or not an abnormality has occurred, rather than based on the feature value.

If the determination result indicating a forward shift is output from the abnormality determiner 22, the control instructor 24 generates control information for performing preventive control to stop operations of the top sealing mechanism 90 after three cycles so that the top sealing mechanism 90 does not perform processing such as top sealing and cutting on this workpiece 50, and outputs the generated control information to the controller 12. This is because the workpiece 50 detected by the optical sensor 82 is conveyed to the top sealing mechanism 90 after three cycles, as shown in (c) and (d) of FIG. 2.

On the other hand, if the determination result indicating a backward shift is output from the abnormality determiner 22, the control instructor 24 generates control information for performing preventive control to stop operations of the top sealing mechanism 90 after four cycles so that the top sealing mechanism 90 does not perform processing such as top sealing and cutting on this workpiece 50, and outputs the generated control information to the controller 12. This is because, as mentioned above, a workpiece 50 detected by the optical sensor 82 is conveyed to the top sealing mechanism 90 after three cycles, but in the case of a backward shift, processing such as top sealing and cutting is performed in the top sealing mechanism 90 after i.e. four cycles, i.e. after the cycle subsequent to three cycles.

The controller 12 outputs the control information output from the control instructor 24 to the top sealing mechanism 90. Thus, even if the workpiece 50 that is shifted forward or backward is conveyed to the top sealing mechanism 90, processing such as top sealing or cutting is not performed, and the workpiece 50 is discharged from the horizontal pillow packaging machine 40. The top sealing mechanism 90 operates normally from the next cycle.

If it is not determined that the workpiece 50 is not shifted forward or backward, the abnormality determiner 22 does not output any determination result to the control instructor 24. In this case, the top sealing mechanism 90 operates normally.

Next, a description will be given of operations performed when the horizontal pillow packaging machine 40 is controlled by the control apparatus 10 according to a first embodiment that is configured as described above.

Figure 6:
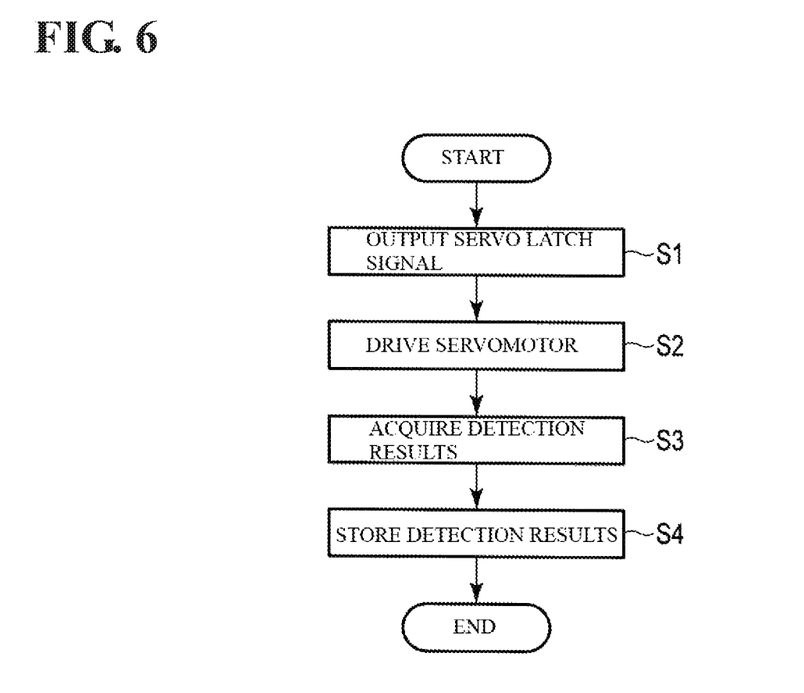
FIG. 6 is a flowchart illustrating an operation example when a control apparatus to which a control method according to a first embodiment is applied acquires data.

First, an example of operations performed when data is acquired will be described using the flowchart shown in FIG. 6.

To start the horizontal pillow packaging machine 40, the servo latch signal is output in every fixed period T from the controller 12 to the servomotors 62, 75, 83, and 92 and the data accumulator 16 (S1). The servomotors 62, 75, 83, and 92 are driven in accordance with intervals of the servo latch signal. The data accumulator 16 stores information regarding the time at which the servo latch signal is output.

As a result of the servomotors 62, 75, 83, and 92 being thus driven by the servo latch signal, the horizontal pillow packaging machine 40 is started, and a workpiece 50 and the film 71 are conveyed toward the downstream unit side (S2).

In response thereto, in the film conveyance mechanism (main) 70, the register marks in the film 71 are detected by the optical sensor 74. The torque of the servomotor 75 is also detected. In the workpiece conveyance mechanism 60, the workpiece 50 is detected by the optical sensor 64. Furthermore, in the film conveyance mechanism (sub) 80, the workpiece 50 is detected by the optical sensor 82. The aforementioned detection result data is constantly output to the data acquirer 14 (S3).

The aforementioned detection result data is further output to the data accumulator 16 by the data acquirer 14, and is stored in the data accumulator 16 (S4).

Figure 7:
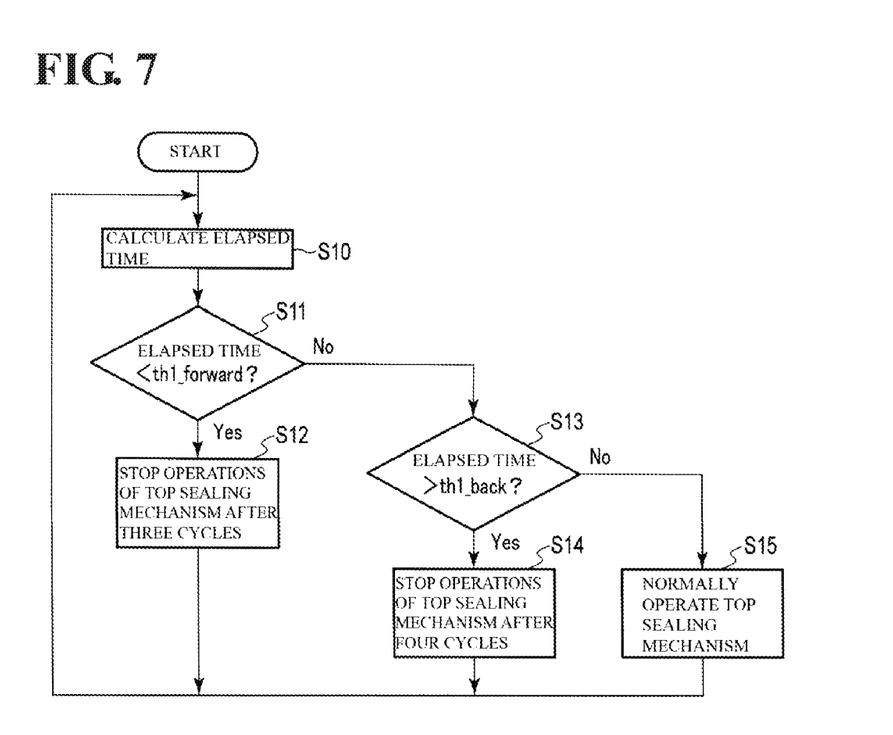
FIG. 7 is a flowchart illustrating an operation example when a control apparatus to which a control method according to a first embodiment is applied performs workpiece shift determination.

Next, an example of operations performed for determining a shift of a workpiece will be described using the flowchart shown in FIG. 7.

In the feature value deriver 20, analysis is performed based on the detection result data stored in the data accumulator 16, and the feature value is derived. The following description will take, as an example, a case where the feature value deriver 20 calculates, as the feature value, elapsed time from a rise of the servo latch signal from the controller 12 until a rise of the detection signal from the optical sensor 82.

In the feature value deriver 20, the elapsed time from a rise of the servo latch signal S until when the detection signal W from the optical sensor 82 is detected is calculated based on the detection result data stored in the data accumulator 16 (S10). The calculated elapsed time is output as the feature value to the abnormality determiner 22.

In the abnormality determiner 22, the elapsed time output from the feature value deriver 20 is compared with the threshold th1_forward that is predetermined for a forward shift (S11). If the elapsed time is shorter than the threshold th1_forward (S11: Yes), it is determined that the workpiece 50 has shifted forward, as shown in (b) of FIG. 9. This determination result is output from the abnormality determiner 22 to the control instructor 24.

Upon the determination result indicating a forward shift being output from the abnormality determiner 22 to the control instructor 24, control information for performing preventive control to stop operations of the top sealing mechanism 90 after three cycles is generated by the control instructor 24, and is output to the controller 12. This control information is further output from the controller 12 to the top sealing mechanism 90 (S12). As a result, even if the workpiece 50 that is shifted forward is conveyed to the top sealing mechanism 90, processing such as top sealing or cutting is not performed, and the workpiece 50 is discharged from the horizontal pillow packaging machine 40. Thus, a jam in the top sealing mechanism 90 caused by a forward shift of the workpiece 50 is prevented. Thereafter, the top sealing mechanism 90 operates normally from the next cycle.

On the other hand, in the abnormality determiner 22, if, in step S11, the elapsed time is not shorter than the threshold th1_forward (S11: No), the elapsed time is compared with the threshold th1_back that is predetermined for a backward shift (S13). If the elapsed time is longer than the threshold th1_back (S13: Yes), it is determined that the workpiece 50 has shifted backward, as shown in (c) of FIG. 9. This determination result is output from the abnormality determiner 22 to the control instructor 24.

Upon the determination result indicating a backward shift being output from the abnormality determiner 22 to the control instructor 24, control information for performing preventive control to stop operations of the top sealing mechanism 90 after four cycles is generated by the control instructor 24, and is output to the controller 12 (S14). As a result, even if the workpiece 50 that is shifted backward is conveyed to the top sealing mechanism 90, processing such as top sealing or cutting is not performed, and the workpiece 50 is discharged from the horizontal pillow packaging machine 40. Thus, a jam in the top sealing mechanism 90 caused by a backward shift of the workpiece 50 is prevented. Thereafter, the top sealing mechanism 90 operates normally from the next cycle.

Furthermore, in the abnormality determiner 22, if, in step S13, the elapsed time is not longer than the threshold th1_back (S13: No), i.e. if it is not determined that the workpiece 50 is shifted forward or backward, no determination results are output from the abnormality determiner 22 to the control instructor 24. As a result, the top sealing mechanism 90 continues to operate normally (S15).

As described above, according to a first embodiment, if a forward shift or a backward shift of a workpiece 50 that may cause a jam is detected, preventive control for preventing a jam is performed. Thus, a jam can be avoided while continuing the operations of the horizontal pillow packaging machine 40.

With this configuration, high operation efficiency of the horizontal pillow packaging machine 40 can be kept.

Second Embodiment

Since a second embodiment has been made by partially modifying a first embodiment, differences from a first embodiment are described below, and redundant descriptions are omitted.

That is to say, a first embodiment has been described regarding an example of using the detection result data from the optical sensor 82 to determine a shift of a workpiece 50. Meanwhile, a second embodiment uses the results of capturing an image using a camera (not shown), instead of the optical sensor 82.

As described again using FIG. 3, when a workpiece 50 is in a normal state without any shift, the optical sensor 82 starts detection of the workpiece 50 after the time Td from a rise of the servo latch signal S has passed. Thus, in the case of the normal state, the time (Td+Tw/2) from a rise of the servo latch signal S until the arrival of the planar center point of the aforementioned workpiece 50 is known. Here, the time Tw corresponds to the pulse width of the detection signal W.

Accordingly, in the case of the normal state, if an image of the workpiece 50 is captured using a camera, which is installed in place of the optical sensor 82, after the time (Td+Tw/2) from the rise time of the servo latch signal S has passed, an image such as that shown in (a) of FIG. 9 is obtained.

In contrast, if an image of a workpiece 50 that is shifted forward is captured, an image such as that shown in (b) of FIG. 9 is obtained. If an image of a workpiece 50 that is shifted backward is captured, an image such as that shown in (c) of FIG. 9 is obtained.

The data acquirer 14 acquires this image data, and also causes the data accumulator 16 to accumulate the acquired image data.

The feature value deriver 20 calculates the amount of displacement of the planar center point of the workpiece 50 from a predetermined position ((coordinates of the planar center point of the workpiece 50)-(coordinates of the predetermined position)), based on the image data.

For example, in the case of the normal state as shown in (a) of FIG. 9, the planar center point of the workpiece 50 coincides with the predetermined position (intersection point between the broken line A and the broken line B), and accordingly, the amount of displacement is zero.

In contrast, in a state of a forward shift as shown in (b) of FIG. 9, the planar center point of the workpiece 50 is located on the forward direction side (downstream unit side) on the X axis relative to the predetermined position, and accordingly, the amount of displacement takes a positive value. Conversely, in a state of a backward shift as shown in (c) of FIG. 9, the center position of the workpiece 50 is located on the reverse direction side (upstream unit side) on the X axis relative to the predetermined position, and accordingly, the amount of displacement takes a negative value.

The feature value deriver 20 outputs such an amount of displacement as the feature value to the abnormality determiner 22.

If the amount of displacement takes a positive value, the abnormality determiner 22 compares the amount of displacement with a threshold th2_forward (positive value), which is predetermined for a forward shift. If the amount of displacement is greater than the threshold th2_forward, it is determined that the workpiece 50 is shifted forward, as shown in (b) of FIG. 9. Then, the determination result is output to the control instructor 24.

On the other hand, if the amount of displacement takes a negative value, the abnormality determiner 22 compares the absolute value of the amount of displacement with a threshold th2_back (positive value), which is predetermined for a backward shift. If the absolute value of the amount of displacement is greater than the threshold th2_back, it is determined that the workpiece 50 is shifted backward, as shown in (c) of FIG. 9. Then, the determination result is output to the control instructor 24. Note that the threshold th2_forward (positive value) and the threshold th2_back (positive value) may be either the same value or different values.

The control instructor 24 generates control information in accordance with the determination result output from the abnormality determiner 22 as described in a first embodiment, and outputs the generated control information to the controller 12. The controller 12 outputs this control information to the top sealing mechanism 90.

With this configuration as well, if a forward shift or a backward shift of a workpiece 50 that may cause a jam is detected, the control apparatus 10 performs preventive control for preventing a jam, similarly to a first embodiment. Thus, a jam can be avoided while continuing the operations of the horizontal pillow packaging machine 40.

With this configuration, high operation efficiency of the horizontal pillow packaging machine 40 can be maintained.

Modifications

In the above embodiments, the timing of performing preventive control for the top sealing mechanism 90 is determined by counting cycles. In contrast, in this modification, this timing is determined by counting the time instead.

For this purpose, the control instructor 24 gets, in advance, the time (conveyance time t) required for the workpiece 50 detected by the optical sensor 82 to be conveyed to the top sealing mechanism 90. Next, if it is determined by the abnormality determiner 22 that the workpiece 50 is shifted forward or backward, the control instructor 24 generates control information for stopping operations of the top sealing mechanism 90 after time (t−α) until time (t+α) elapses. Note that α denotes a constant that represents a period, and a relationship of 0<α<t holds.

The constant α is appropriately determined in accordance with the length of the workpiece 50 in the conveyance direction, the conveyance speed, and the amount of a forward shift or a backward shift.

If the value of the constant α is too large, there is a concern that not only a workpiece 50 that is shifted forward or backward but also a workpiece 50 in the normal state that is being conveyed in front of or rear of the shifted workpiece 50 will be passed through the top sealing mechanism 90 without being processed by the top sealing mechanism 90. This will lower the yield.

Conversely, if the value of the constant α is too small, there is also a concern that the workpiece 50 that is shifted forward or backward will not be not avoided and be subjected to top sealing and cutting in the top sealing mechanism 90, resulting in a jam.

By setting the constant α to an appropriate value, it is possible to selectively stop the operations of the top sealing mechanism 90 for the workpiece 50 that is shifted forward or backward and avoid a jam in the top sealing mechanism 90, while continuing the operations of the horizontal pillow packaging machine 40. As a result, high operation efficiency of the horizontal pillow packaging machine 40 can be maintained.

As described above, the method of counting time can also be used, in place of the method of counting cycles, as the method for determining the timing of performing preventive control.

Although the best modes for carrying out one or more embodiments have been described with reference to the attached drawings, the present invention is not limited to the above-described configurations. A person skilled in the art may conceive various modifications and variations within the scope of the invented technical ideas described in the appended patent claims, and those modifications and variations are also understood to be encompassed in the technical scope of the present invention.

(Note 1)

A control apparatus for controlling a packaging machine that includes a conveyance mechanism for conveying an item to be packaged, the control apparatus including a hardware processor,
wherein the hardware processor is configured to:
acquire, from a sensor for detecting a position of the item to be packaged, position detection information indicating a position to which the item to be packaged is conveyed in the conveyance mechanism;
determine a shift direction in which the item to be packaged is shifted from a predetermined position relative to a conveyance direction, based on the acquired position detection information; and
control, for the item to be packaged for which position detection is performed by the sensor, implementation of a downstream unit that is downstream of a unit in which the position detection is performed by the sensor, based on the determined shift direction.

(Note 2)

A control apparatus for controlling a packaging machine that includes a conveyance mechanism for conveying an item to be packaged, the control apparatus including a hardware processor,
wherein the hardware processor is configured to:
acquire, from a sensor for detecting the item to be packaged, conveyance timing detection information indicating a conveyance timing at which the item to be packaged is conveyed in the conveyance mechanism;

obtain elapsed time from a preset reference time point until when the item to be packaged is detected by the sensor, based on the conveyance timing detection information acquired by the acquirer, and determine a shift direction in which the item to be packaged is shifted from a predetermined position, based on the elapsed time; and control, for the item to be packaged for which detection is performed by the sensor, implementation of a downstream unit that is downstream of a unit in which the detection is performed by the sensor, based on the determined shift direction.

(Note 3)

A method for controlling a packaging machine that includes a conveyance mechanism for conveying an item to be packaged, the method including:

acquiring, from a sensor for detecting a position of the item to be packaged, position detection information indicating a position to which the item to be packaged is conveyed in the conveyance mechanism, by using a hardware processor;

determining a shift direction in which the item to be packaged is shifted from a predetermined position relative to a conveyance direction, based on the acquired position detection information, by using the hardware processor; and controlling, for the item to be packaged for which position detection is performed by the sensor, implementation of a downstream unit that is downstream of a unit in which the position detection is performed by the sensor, based on the determined shift direction, by using the hardware processor.

(Note 4)

A method for controlling a packaging machine that includes a conveyance mechanism for conveying an item to be packaged, the method including:

acquiring, from a sensor for detecting the item to be packaged, conveyance timing detection information indicating a conveyance timing at which the item to be packaged is conveyed in the conveyance mechanism, by using the hardware processor;

obtaining elapsed time from a preset reference time point until when the item to be packaged is detected by the sensor, based on the acquired conveyance timing detection information, and determining a shift direction in which the item to be packaged is shifted from a predetermined position, based on the acquired elapsed time, by using the hardware processor; and controlling, for the item to be packaged for which detection is performed by the sensor, implementation of a downstream unit that is downstream of a unit in which the detection is performed by the sensor, based on the determined shift direction, by using the hardware processor.

The invention claimed is:

1. A control apparatus for controlling a packaging machine that includes a conveyance mechanism for conveying an item to be packaged, the apparatus comprising a processor configured with a program to perform operations comprising:

operation as an acquirer configured to acquire, from a sensor for detecting the item to be packaged, conveyance timing detection information indicating a conveyance timing at which the item to be packaged is conveyed in the conveyance mechanism;

operation as a determiner configured to obtain elapsed time from a preset reference time point until a time when the item to be packaged is detected by the sensor, based on the conveyance timing detection information acquired by the acquirer, and determine a shift direction from a direction toward a downstream unit side, and a direction toward an upstream unit side, in which the item to be packaged is shifted from a predetermined position, based on the elapsed time; and operation as a controller configured to control, for the item to be packaged for which detection is performed by the sensor, implementation of a downstream unit that is downstream of a unit in which the detection is performed by the sensor, based on the shift direction that is determined by the determiner.

2. The control apparatus according to claim 1, wherein the processor is configured with the program to perform operation such that operation as the determiner determines that the shift direction comprises the direction toward a downstream unit side in response to the elapsed time being shorter than a predetermined first threshold, determines that the shift direction comprises the direction toward an upstream unit side in response to the elapsed time being longer than a predetermined second threshold, in response to determining that the shift direction is a direction toward the downstream unit side, the controller controls the packaging machine so that the downstream unit is not implemented for the item to be packaged for which the detection is performed by the sensor, during a processing period in which a shift does not occur, and in response to determining that the shift direction is a direction toward the upstream unit side, the controller controls the packaging machine so that the downstream unit is not implemented for the item to be packaged for which the detection is performed by the sensor, during a processing period that comes later than the processing period in which the shift does not occur.

3. The control apparatus according to claim 2, wherein the processing period in which the shift does not occur is defined by a cycle representing a unit of processing time for processing to be performed by each of a plurality of units, and the processing period that comes later than the processing period in which the shift does not occur starts one cycle after the processing period in the case where the shift does not occur.

4. A packaging machine comprising the control apparatus according to claim 3.

5. A non-transitory computer-readable storage medium storing a program for causing a computer to function as each unit in the control apparatus according to claim 3.

6. The control apparatus according to claim 2, wherein, the packaging machine comprises a pillow packing machine that includes a unit for covering at least a plurality of the items to be packaged with a packaging material, and a unit for separating the plurality of covered items to be packaged by a preset unit number, the processor is configured with the program such that operation as the controller controls the pillow packaging machine so that the separating unit is not implemented for an item to be packaged regarding which the shift direction is determined, while giving consideration to time required from implementation of the unit in which the detection is performed by the sensor until implementation of the separating unit.

7. A packaging machine comprising the control apparatus according to claim 6.

8. A non-transitory computer-readable storage medium storing a program for causing a computer to function as each unit in the control apparatus according to claim 5.

9. A packaging machine comprising the control apparatus according to claim 2.

10. A non-transitory computer-readable storage medium storing a program for causing a computer to function as each unit in the control apparatus according to claim 2.

11. A packaging machine comprising the control apparatus according to claim 1.

12. A non-transitory computer-readable storage medium storing a program for causing a computer to function as each unit in the control apparatus according to claim 1.

13. A method for controlling a packaging machine that includes a conveyance mechanism for conveying an item to be packed, the method comprising:

acquiring, from a sensor for detecting the item to be packaged, conveyance timing detection information indicating a conveyance timing at which the item to be packaged is conveyed in the conveyance mechanism, obtaining elapsed time from a preset reference time point until when the item to be packaged is detected by the sensor, based on the acquired conveyance timing detection information, and determining a shift direction from a direction toward a downstream side of the conveyance mechanism, and a direction toward an upstream side of the conveyance mechanism, in which the item to be packaged is shifted from a predetermined position, based on the elapsed time, and controlling, for the item to be packed for which detection is performed by the sensor, implementation of a downstream unit that is downstream of a unit in which the detection is performed by the sensor, based on the determined shift direction.

* * * * *